United States Patent
Huang

(10) Patent No.: US 10,723,296 B2
(45) Date of Patent: Jul. 28, 2020

(54) METHOD AND APPARATUS FOR CONTROLLING THE ELECTRICAL CONNECTION AND DISCONNECTION BETWEEN A BATTERY UNIT AND A SUPERCAPACITOR ON AN AUTOMOBILE

(71) Applicant: Yung-Sheng Huang, Taipei (TW)

(72) Inventor: Yung-Sheng Huang, Taipei (TW)

( * ) Notice: Subject to any disclaimer, the term of this patent is extended or adjusted under 35 U.S.C. 154(b) by 0 days.

(21) Appl. No.: 16/183,751

(22) Filed: Nov. 8, 2018

(65) Prior Publication Data

US 2020/0148143 A1  May 14, 2020

(51) Int. Cl.
*H02J 7/00* (2006.01)
*H02J 7/34* (2006.01)
*B60R 16/033* (2006.01)

(52) U.S. Cl.
CPC .......... *B60R 16/033* (2013.01); *H02J 7/0063* (2013.01); *H02J 7/0068* (2013.01); *H02J 7/345* (2013.01); *H02J 2007/0067* (2013.01)

(58) Field of Classification Search
None
See application file for complete search history.

(56) References Cited

U.S. PATENT DOCUMENTS

| | | | |
|---|---|---|---|
| 2003/0214270 | A1 | 11/2003 | Shiue et al. |
| 2006/0152085 | A1* | 7/2006 | Flett .......................... B60L 9/30 307/75 |
| 2007/0182248 | A1 | 8/2007 | Blaker et al. |
| 2008/0111524 | A1 | 5/2008 | Rydman et al. |
| 2008/0276892 | A1* | 11/2008 | Doljack .............. F02N 11/0866 123/179.28 |
| 2009/0096285 | A1 | 4/2009 | Acena et al. |
| 2009/0322101 | A1* | 12/2009 | Reynolds ............ F02N 11/0866 290/38 R |

* cited by examiner

*Primary Examiner* — Jared Fureman
*Assistant Examiner* — Aqeel H Bukhari
(74) *Attorney, Agent, or Firm* — Bacon & Thomas, PLLC

(57) ABSTRACT

A method and apparatus is proposed for controlling the electrical connection and disconnection between a battery unit and a supercapacitor on an automobile with the objective of preventing the electrical connection between the battery unit and the supercapacitor from being exceedingly long that would otherwise cause degraded power supply performance or even damage to the battery unit due to the self-discharging property of the supercapacitor. This feature can help to improve the power supply performance and extends the battery life. The proposed method and apparatus is characterized by the steps that the supercapacitor is electrically connected to the battery unit only at a temporal point when there is a need to use the supercapacitor, and immediately disconnected from the supercapacitor whenever there is no more need to use the supercapacitor.

15 Claims, 4 Drawing Sheets

METHOD AND APPARATUS FOR CONTROLLING THE ELECTRICAL CONNECTION AND DISCONNECTION BETWEEN A BATTERY UNIT AND A SUPERCAPACITOR ON AN AUTOMOBILE

BACKGROUND OF THE INVENTION

1. Field of the Invention

The invention relates to battery power supply technology for automobile, and more particularly to a method and apparatus for controlling the electrical connection and disconnection between a battery unit and a supercapacitor on an automobile at specific temporal points in such a manner that allows the supercapacitor to be electrically connected to the battery unit only when the automobile is set by the user to a ready-for-startup state, and promptly disconnected from the battery unit when the automobile stops running. This feature can help to improve the battery power supply performance and extends the battery life.

2. Description of Related Art

The automobile is a common and widely used means for transportation which is typically powered by a gasoline-based engine and uses a startup motor which is powered by a battery unit for starting up the automobile engine. In the use of the battery unit on the automobile, however, there exists a problem that when the battery unit is subjected to the condition of a large instantaneous surge current, such as at the instant when the startup motor is activated to start up the automobile engine, at the time when the automobile is accelerating, or at the time when the automobile is climbing up a steep mountain slope, the occurrence of the large instantaneous surge current could cause damage to the battery unit and thus rapid aging of the battery unit that degrades the battery life. One solution to this problem is to provide a supercapacitor (also called ultra-capacitor) which is connected in parallel with the battery unit so that whenever the startup motor needs a large instantaneous surge current to operate, the supercapacitor is used in place of the battery unit to supply the required instantaneous surge current to the startup motor. Therefore, the use of the supercapacitor can help to improve the power supply performance and extends the battery life.

However, in the above-mentioned solution of using a supercapacitor for supplying the instantaneous surge current to the startup motor, there is problem that the supercapacitor is configured in such a manner that it is fixed and permanently connected to the battery unit such that the supercapacitor is constantly being charged by the battery unit. Since the supercapacitor has a self-discharging property, if the duration of electrical connection between the supercapacitor and the battery unit is exceedingly long, it would cause the supercapacitor to continuously draw electricity from the battery unit and then discharge the charged electricity due to its self-discharging property, thus causing the battery power to be wasted, or even causing damage to the battery unit.

In view of the above-mentioned problem, there exists therefor a need in the automobile industry for a solution that can be used to prevent the supercapacitor from being fixedly and permanently connected to the battery unit for the purpose of preventing the supercapacitor's self-discharging property from causing degraded power supply performance or damage to the battery unit.

SUMMARY OF THE INVENTION

It is therefore the primary objective of this invention to provide a solution to the above-mentioned problem which can help prevent the supercapacitor from being fixedly and permanently connected to the battery unit for the purpose of preventing the supercapacitor's self-discharging property from causing degraded power supply performance or even damage to the battery unit, thus improving the power supply performance and extends the battery life.

The research effort of the invention is therefore focused on how the battery unit can be electrically connected to the supercapacitor only when there is a need to use the supercapacitor, and immediately disconnected from the supercapacitor whenever there is no more need to use the supercapacitor.

As a solution to the above-mentioned problem, the invention provides a method and apparatus for controlling the electrical connection and disconnection between the battery unit and the supercapacitor on the automobile.

The method of the invention comprises the following steps:

(a) at a temporal point when the automobile is being set to a ready-for-startup state, connecting the battery unit to the supercapacitor to allow the battery unit to charge the supercapacitor;

(b) at a temporal point when the automobile is being set to a motor power-on state, electrically connecting the supercapacitor to the startup motor for supplying an instantaneous surge current to the startup motor for initial startup;

(c) when the automobile is running, maintaining the parallel configuration of the supercapacitor with the battery unit for supplying a steady-state voltage to the electrical system, and at a temporal point when the electrical system is being subjected to an overload condition, using the supercapacitor to supply an instantaneous surge current to the electrical system; and (d) at a temporal point when the automobile is being set to a stop-running state, disconnecting the battery unit from the supercapacitor.

In practical implementation, the above method is performed by an apparatus which comprises: (a) a microcontroller unit (MCU), (b) an operating-state detecting unit, (c) a switching unit, (d) a voltage booster, and (e) a first voltage sensing module and a second voltage sensing module.

As a summary, the invention is characterized in the steps that the supercapacitor is electrically connected to the battery unit only when the user wants to drive the automobile, and then immediately disconnected from the battery unit when the automobile stops running. This feature can help to prevent the electrical connection between the battery unit and the supercapacitor from being exceedingly long that would otherwise cause degraded power supply performance or even damage to the battery unit due to the self-discharging property, thus helping to improve the power supply performance, and extends the battery life. Moreover, the supercapacitor cannot be pre-charged in advance since its self-discharging property would cause the charged electricity to be quickly discharged and thus wasted. The invention solves this problem by electrically connecting the supercapacitor to the battery unit only at a temporal point when the user is getting ready to drive the automobile. In conclusion, the invention can serve as a feasible solution to the problem caused by the use of the supercapacitor 40 on the automobile.

DETAILED DESCRIPTION OF PREFERRED EMBODIMENTS

The present invention proposes a novel method and apparatus for controlling the electrical connection and disconnection between a battery unit and a supercapacitor on an automobile, which is disclosed in full details by way of preferred embodiments in the following with reference to the accompanying drawings.

Figure 1:
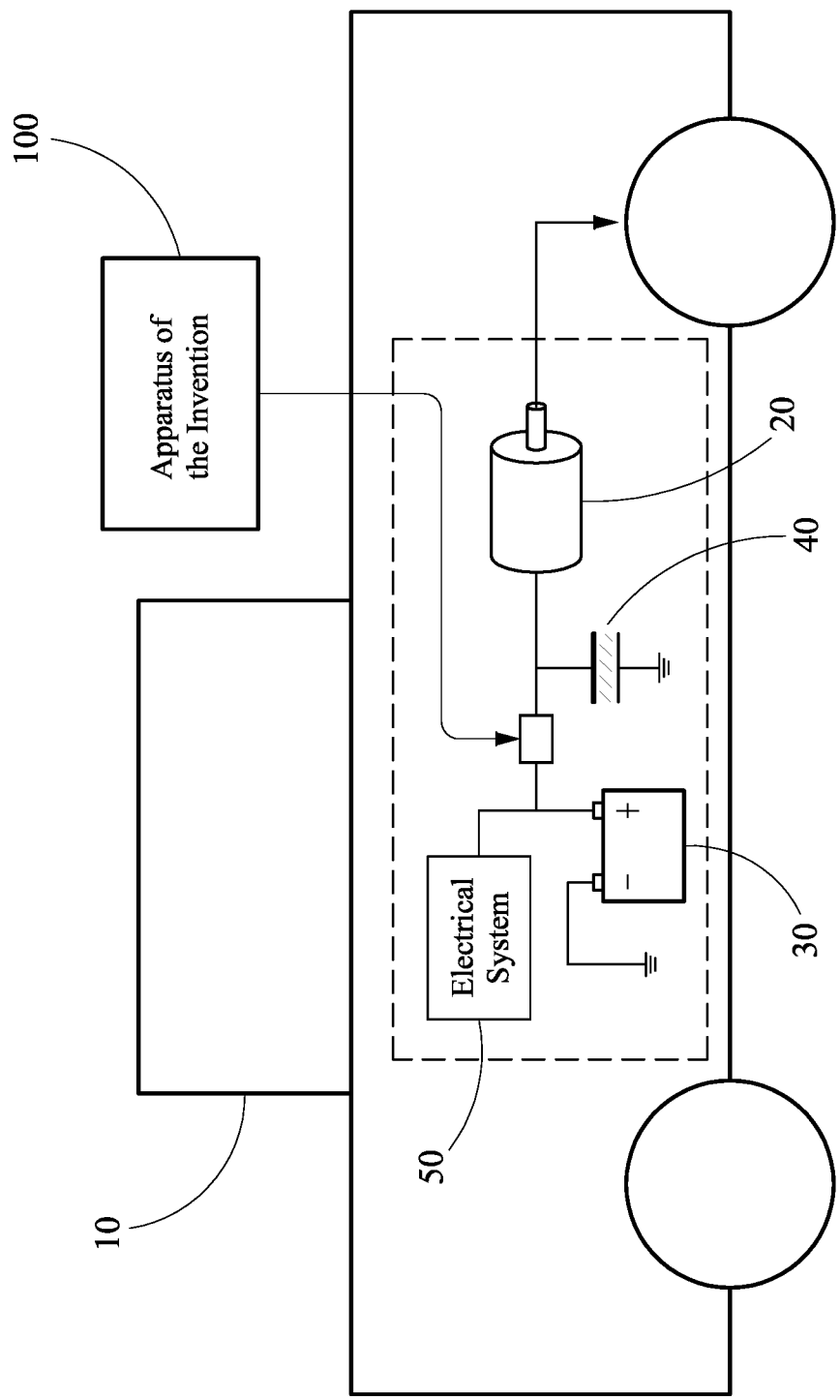
FIG. 1 is a schematic diagram showing the application of the apparatus of the invention with an automobile for controlling the electrical connection and disconnection between a battery unit and a supercapacitor on the automobile.

FIG. 1 is a schematic diagram showing the architecture of application of the invention with an automobile 10, where the invention is realized as an apparatus indicated by the numeral 100. In practice, the automobile 10 can be any type of automobile that relies on battery power for engine startup, including four-wheel cars, three-wheel cars, two-wheel motorcycles, or any type of vehicles. The automobile 10 uses a startup motor 20 for engine startup to drive the wheels and uses a battery unit 30 to supply electrical power to activate the startup motor 20. In addition, in order to prevent the condition of a large instantaneous surge current from causing degraded power supply performance or even damage to the battery unit 30, the automobile 10 is additionally equipped with a supercapacitor (or call ultra-capacitor) 40 which is used instead of the battery unit 30 to supply an instantaneous surge current to the startup motor 20 at the time of engine startup, thus improving the power supply performance and extending the battery life. Typically, the supercapacitor 40 has a capacitance of greater than 0.1 F (Farad). Moreover, the automobile 10 is equipped with an electrical system 50 which is used in conjunction with the battery unit 30 to supply electrical power to other parts of the automobile 10, including the head light, the horn, and any other parts of the automobile 10 that require electricity to operate.

However, as explained above in the background of the invention section, if the electrical connection between the battery unit 30 and the supercapacitor 40 is fixed and permanent, it could result in a problem that would cause degraded power supply performance or even damage to the battery unit 30. To solve this problem, the automobile 10 is equipped with the apparatus of the invention 100 which can serve as a solution to the above-mentioned problem.

Functionally, the apparatus of the invention 100 is capable of controlling the electrical connection and disconnection between the battery unit 30 and the supercapacitor 40 at specific temporal points in such a manner that only at the temporal point when the automobile 10 is set by the user to a ready-for-startup state, the battery unit 30 is electrically connected to the supercapacitor 40, and at the temporal point when the automobile 10 stops running, i.e. being set to a stop-running state, the battery unit 30 is immediately disconnected from the supercapacitor 40.

To implement the above functionality, the apparatus of the invention 100 is characterized by the use of a switching mechanism for controlling the electrical connection and disconnection between the battery unit 30 and the supercapacitor 40.

Figure 2:
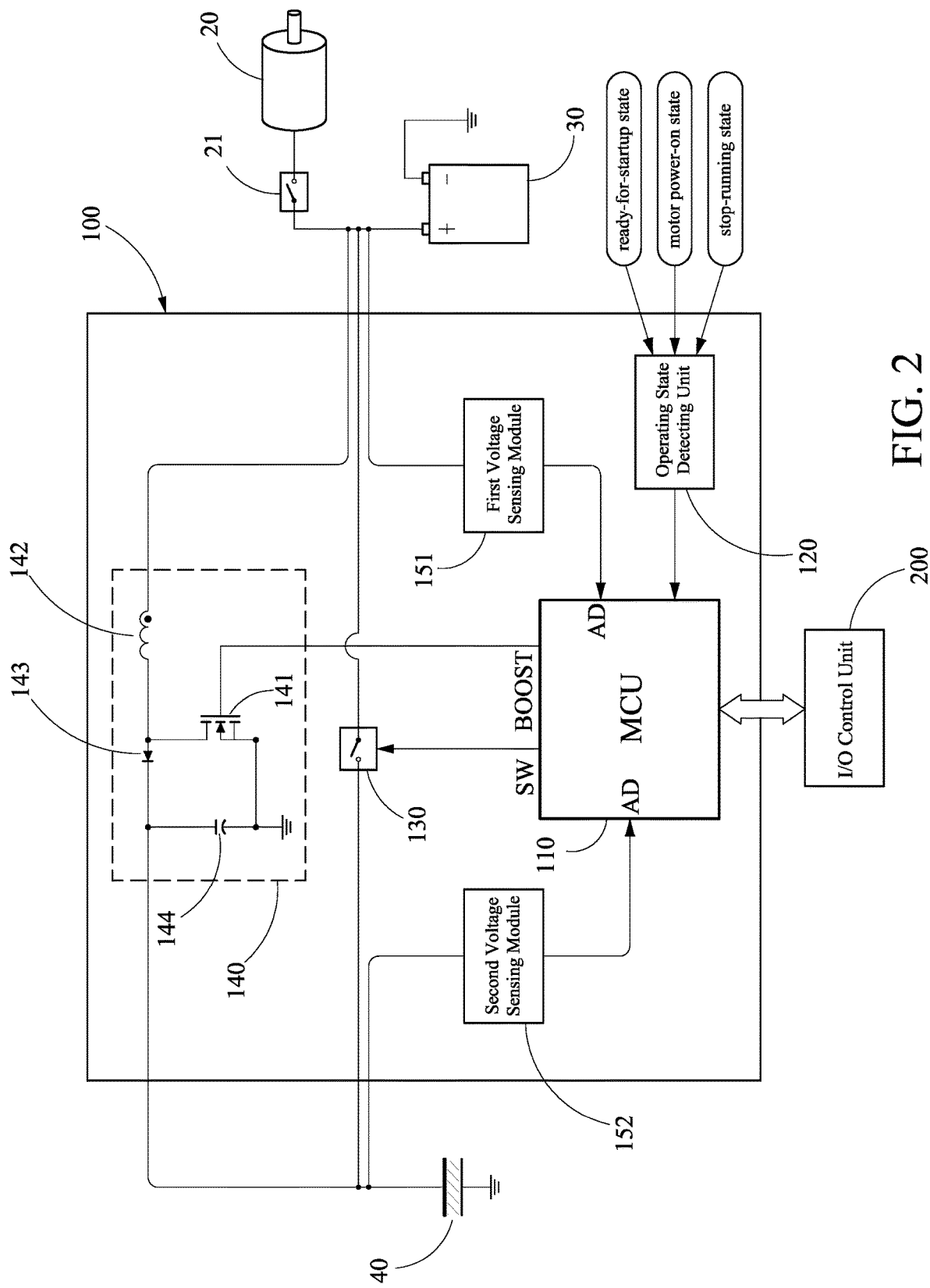
FIG. 2 is a schematic diagram showing the architecture of an embodiment of the apparatus of the invention.

FIG. 2 is a schematic diagram showing the architecture of an embodiment of the apparatus of the invention 100. As shown, the apparatus of the invention 100 comprises: (a) a microcontroller unit (MCU) 110, (b) an operating-state detecting unit 120, (c) a switching unit 130, (d) a voltage booster 140, and (e) a pair of voltage sensing units including a first voltage sensing module 151 and a second voltage sensing module 152. These constituent elements of the apparatus of the invention 100 are respectively described in details in the following.

The MCU 110 is used to control and supervise the operation of the apparatus of the invention 100 for controlling the electrical connection and disconnection between the battery unit 30 and the supercapacitor 40. In practice, the MCU 110 can be implemented with a microprocessor, such as an embedded microprocessor, or a customized programmable logic circuit, such as ASIC (Application-Specific Integrated Circuit), FPGA (Field Programmable Gate Array), PLD (Programmable Logic Device), PLA (Programmable Logic Array), or PAL (Programmable Array Logic), to name just a few.

Figure 4:
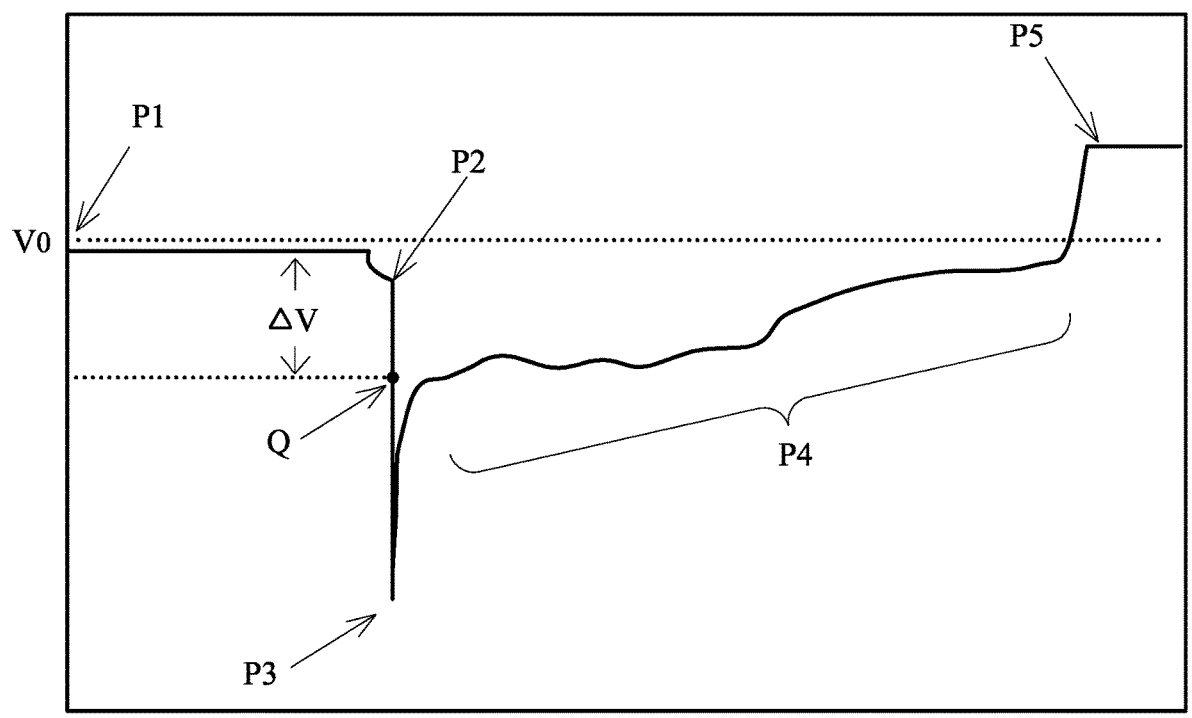
FIG. 4 is a waveform diagram showing the waveform of a voltage drop in the output voltage of the battery unit at the temporal point when the startup motor is initially activated to start up the automobile engine.

The operating-state detecting unit 120 is capable of detecting the operating state of the automobile 10, i.e., detecting whether the automobile 10 is currently in one of the following operating states: (1) ready-for-startup state, (2) motor power-on state, and (3) stop-running state. At a temporal point when the operating-state detecting unit 120 detects the occurrence of the ready-for-startup state, it will send a supercapacitor connection enable signal to the MCU 110. At a temporal point when the operating-state detecting unit 120 detects that the occurrence of the stop-running state, it will send a supercapacitor connection disable signal to the MCU 110. In practical applications, since there are many various different types of automobiles on the market that operate in different ways, the ready-for-startup state can be implemented with various different fashions so that in this specification, the term "ready-for-startup state" is defined as any one of the following operating states:

(1) a remotely-controlled automobile-unlocking operating state, which is in this specification defined as an operating state that occurs at a temporal point when the automobile 10 receives a wireless unlocking signal from a remote controller that is used by the user for unlocking the automobile 10;

(2) a key-triggered automobile-unlocking operating state, which is in this specification defined as an operating state that occurs at a temporal point when a key that is used to unlock and start the automobile 10 is inserted in position by the user into a key-triggered switch provided on the control panel of the automobile 10; and (3) a motor-startup voltage-drop operating state, which is in this specification defined as an operating state that occurs at a temporal point when a voltage drop $\Delta V$ is generated in the output voltage of the battery unit 30, i.e., the initial no-load voltage $V_o$ is dropped by the magnitude $\Delta V$ due to the battery unit 30 supplying a large instantaneous surge current to the startup motor 20, which will be described in more details in the following with reference to FIG. 4.

At a temporal point when the operating-state detecting unit 120 detects the occurrence of any one of the above-listed operating states, it will promptly send a supercapacitor connection enable signal to the MCU 110, thereby activating the MCU 110 to turn the switching unit 130 to ON state for electrically connecting the battery unit 30 to the supercapacitor 40. On the other hand, at a temporal point when the operating-state detecting unit 120 detects that the occurrence of the stop-running state, i.e., when the automobile 10 stops running, it will promptly send a supercapacitor connection disable signal to the MCU 110, thereby activating the MCU 110 to turn the switching unit 130 to OFF state for disconnecting the battery unit 30 from the supercapacitor 40.

FIG. 4 is a waveform diagram used to depict the above-mentioned motor-startup voltage-drop operating state that occurs at a temporal point when the startup motor 20 is initially activated for engine startup of the automobile 10. As shown in FIG. 4, it is assumed that when the battery unit 30 is unloaded, its no-load voltage is $V_o$. At the instant when the startup motor 20 is activated, i.e., when the motor switch 21 is turned on to electrically connect the startup motor 20 to the battery unit 30, the waveform of the output voltage of the battery unit 30 includes a series of transitional phases: P1, P2, P3, P4, and P5, which are respectively explained below:

P1: the initial phase before the startup motor 20 is activated when the output voltage of the battery unit 30 is equal to the rated no-load voltage $V_o$;

P2: the transitional point when the startup motor 20 is initially activated and causes a sharp voltage drop in the output voltage of the battery unit 30, which is triggered by either a remote controller or a key when it is being used to unlock and start the automobile 10;

P3: the lowest point of the voltage drop caused by the initial activation of the startup motor 20 since the initial activation of the startup motor 20 requires the battery unit 30 to supply a large instantaneous surge current;

P4: the transitional phase during which the output voltage of the battery unit 30 gradually returns from the lowest point P3 to the rated voltage level; and P5: the transitional point when the output voltage of the battery unit 30 overshoots the rated voltage level, which indicates that the automobile 10 is running at a cruising speed.

In the waveform shown in FIG. 4, an appropriate middle point Q between the points P2 and P3 is chosen in accordance with the invention as a triggering point for the ready-for-startup state. The voltage difference between the point Q and the point P1 is designated by $\Delta V$. In operation, when the operating-state detecting unit 120 detects that the output voltage of the battery unit 30 is dropped from the rated no-load voltage Vo to the triggering point Q such that a voltage drop $\Delta V$ occurs, it will promptly send a supercapacitor connection enable signal to the MCU 110.

The switching unit 130 is interconnected between the battery unit 30 and the supercapacitor 40, and its ON/OFF state is controlled by the MCU 110. The switching unit 130 operates in such a manner that when the MCU 110 receives a supercapacitor connection enable signal from the operating-state detecting unit 120, the MCU 110 will turn the switching unit 130 to the ON state; whereas when the MCU 110 receives a supercapacitor connection disable signal from the operating-state detecting unit 120, the MCU 110 will turn the switching unit 130 to the OFF state. When the switching unit 130 is turned to the ON state, it allows the battery unit 30 to be electrically connected to the supercapacitor 40, thereby allowing the battery unit 30 to charge the supercapacitor 40. On the other hand, when the switching unit 130 is turned to the OFF state, it allows the battery unit 30 to be disconnected from the supercapacitor 40, thereby isolating the battery unit 30 from the supercapacitor 40. In practice, the switching unit 130 can be implemented with an electromechanical relay, a solid-state relay (SSR), or a transistor-based electronic switch.

The voltage booster 140 is interconnected between the battery unit 30 and the supercapacitor 40, which can be activated to operate when receiving a boost enable signal BOOST from the MCU 110. When the voltage booster 140 is activated by the boost enable signal BOOST, it can provide a step-up boost function that allows the battery unit 30 to charge the supercapacitor 40 via the voltage booster 140. As shown in FIG. 2, the voltage booster 140 can be implemented with a conventional type of circuit architecture that is composed of a transistor-based switch 141, an inductor 142, a diode 143, and a capacitor 144. Since this conventional type of circuit architecture is well-known, details thereof will not be described in this specification.

The first voltage sensing module 151 is used to sense the present-time output voltage $V_B$ of the battery unit 30, and the sensed level of VB is sent to the MCU 110; while at the same time, the second voltage sensing module 152 is used to sense the present-time charged voltage $V_C$ of the supercapacitor 40, and the sensed level of $V_C$ is sent to the MCU 110. At the MCU 110, the values of $V_B$ and $V_C$ are first converted into digital form by the built-in A/D (analog to digital) conversion function, and then compared to check whether $V_B$ is greater than $V_C$. If $V_B$ is greater than $V_C$, then the MCU 110 will only turn the MCU 110 to the ON state while disabling the voltage booster 140, thereby directly allowing the battery unit 30 to charge the supercapacitor 40. On the other hand, If $V_B$ is lower than $V_C$, then the MCU 110 will output the boost enable signal BOOST to the voltage booster 140, thereby allowing the battery unit 30 to charge the supercapacitor 40 via the voltage booster 140.

Furthermore, in the embodiment of FIG. 2, the apparatus of the invention 100 can be externally linked to an I/O control unit 200, which allows the apparatus of the invention 100 to be externally linked to a keyboard, a display unit, and a wireless network system (not shown), such as Bluetooth, 4G, Zigbee, UART, or the like. The I/O control unit 200 allows the operating status information about the automobile 10 to be transferred to the display unit to inform the user of the operating status of the automobile 10, or via the wireless network system to a remotely located central administrative station to allow supervising personnel to be informed of the operating status of the automobile 10.

Figure 3:
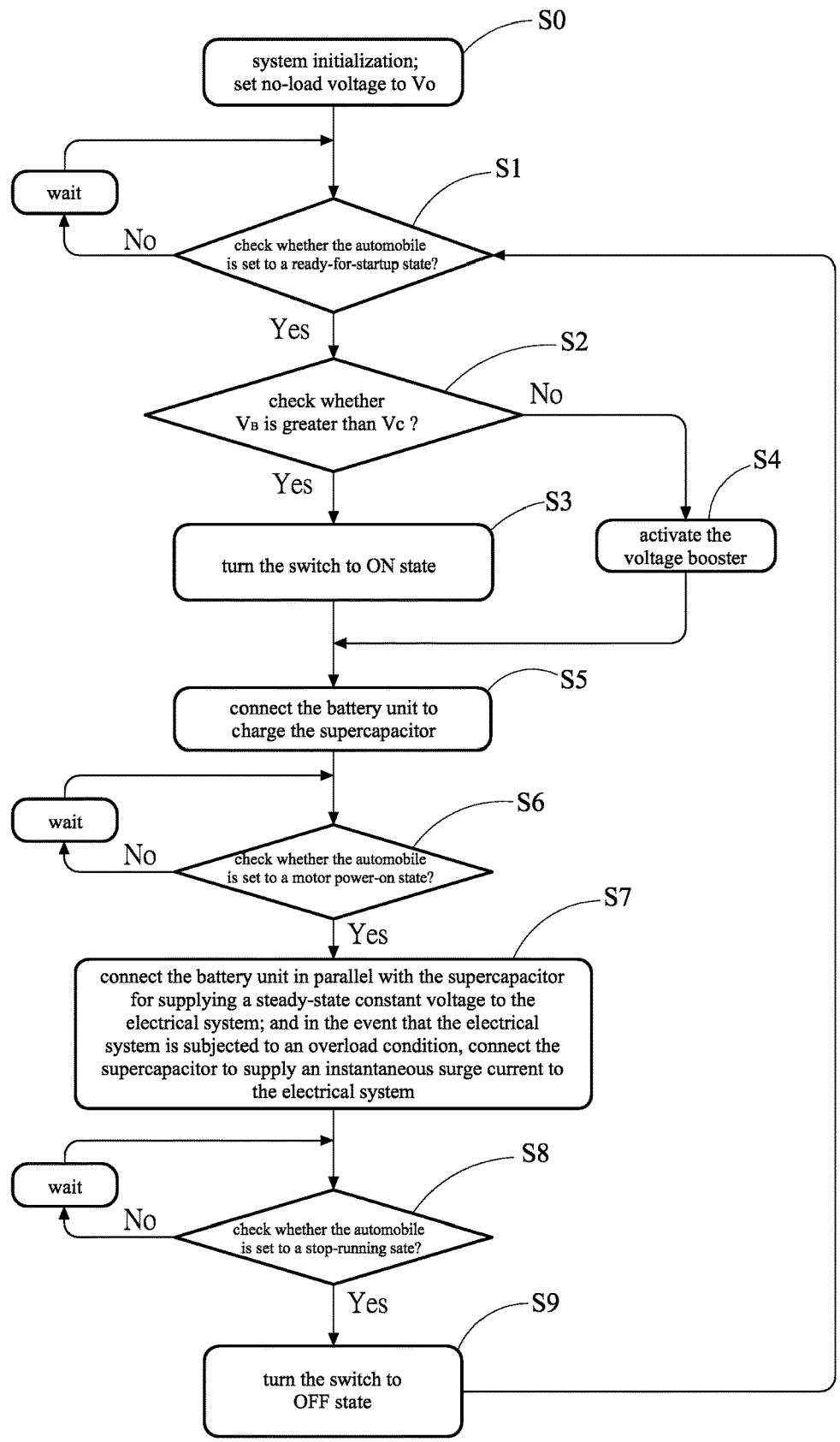
FIG. 3 is a flow diagram showing a sequence of steps performed by the apparatus of the invention for controlling the electrical connection and disconnection between a battery unit and a supercapacitor on an automobile.

The operation of the apparatus of the invention 100 is described in details in the following with reference to the flow diagram of FIG. 3, which performs a series of steps for controlling the electrical connection and disconnection between the battery unit 30 and the supercapacitor 40.

In the initial step S0, the MCU 110 performs system initialization and sets the no-load voltage of the battery unit 30 to the rated voltage $V_o$. When the automobile 10 is not in use, the switching unit 130 is normally turned to the OFF state so that the battery unit 30 is disconnected from the supercapacitor 40.

In the next step S1, the MCU 110 checks whether the operating-state detecting unit 120 detects that the automobile 10 is set by the user to the ready-for-startup state. If YES, the procedure goes to the next step S2; otherwise, if NO, the MCU 110 keeps waiting. The ready-for-startup state can be one of the following operating states: (1) a remotely-controlled automobile-unlocking operating state, which is an operating state that occurs at a temporal point when the automobile 10 receives a wireless unlocking signal from a remote controller that is used by the user for unlocking the automobile 10; (2) a key-triggered automobile-unlocking operating state, which is an operating state that occurs at a temporal point when a key that is used to unlock and start the automobile 10 is inserted in position by the user into a key-triggered switch provided on the control panel of the automobile 10; and (3) a motor-startup voltage-drop operating state, which is an operating state that occurs at a temporal point when a voltage drop $\Delta V$ is generated in the output voltage of the battery unit 30, i.e., the initial no-load voltage $V_o$ is dropped by the magnitude $\Delta V$ due to the battery unit 30 supplying a large instantaneous surge current to the startup motor 20. At the temporal point when the operating-state detecting unit 120 detects the occurrence of the ready-for-startup state, it will promptly send a supercapacitor connection enable signal to the MCU 110. The procedure then goes to the next step S2.

In the next step S2, the MCU 110 compares the present-time output voltage $V_B$ of the battery unit 30 against the present-time charged voltage $V_C$ of the supercapacitor 40. The level of $V_B$ is detected by the first voltage sensing module 151, while the level of $V_C$ is detected by the second voltage sensing module 152. The MCU 110 compares to see if $V_B$ is greater than $V_C$. If $V_B$ is greater than $V_C$, the procedure goes the step S3; otherwise, the procedure goes to the step S4.

In the step S3, the MCU 110 issues a switching control signal SW to the switching unit 130, which turns the switching unit 130 to the ON state, thereby electrically connecting the battery unit 30 to the supercapacitor 40. As a result, the battery unit 30 can charge the supercapacitor 40 via the switching unit 130. The procedure then goes to the step S5.

In the step S4, the MCU 110 sends a boost enable signal BOOST to the voltage booster 140, thereby allowing the battery unit 30 to charge the supercapacitor 40 via the voltage booster 140.

The procedure then goes to the step S5.

In the step S5, the MCU 110 supervises and monitors the charging of the supercapacitor 40 by the output power of the battery unit 30.

In the next step S6, the MCU 110 checks whether the automobile 10 is set to motor power-on state, i.e., whether the motor switch 21 is turned to the ON state to electrically connect the startup motor 20 to the battery unit 30 and the supercapacitor 40. If YES, the procedure goes to the step S7; otherwise, if NO, the MCU 110 keeps waiting.

In the step S7, at the temporal point when the startup motor 20 is activated, since the startup motor 20 initially requires a large instantaneous surge current for engine startup, the MCU 110 maintains the switching unit 130 in the ON state, thereby allowing the charged voltage $V_C$ of the supercapacitor 40 to supply a large instantaneous surge current to the startup motor 20 for engine startup. At a later time when the automobile 10 is running steadily on the road, the battery unit 30 is constantly connected in parallel with the supercapacitor 40 so that a fixed steady-state voltage can be supplied to the electrical system 50 of the automobile 10. In the event that the electrical system 50 is subjected to an overload condition, the supercapacitor 40 can supply a large instantaneous surge current to the electrical system 50.

In the next step S8, the MCU 110 checks whether the operating-state detecting unit 120 detects that the automobile 10 is set to the stop-running state, i.e., when the automobile 10 stops running. If YES, the procedure goes to the step S9; otherwise, if NO, the MCU 110 keeps waiting.

In the step S9, at the temporal point when the automobile 10 is set to the stop-running state, the MCU 110 will immediately turn the switching unit 130 to the OFF state, thereby promptly disconnecting the battery unit 30 from the supercapacitor 40 and thus preventing the electrical connection between the battery unit 30 and the supercapacitor 40 to be exceedingly long that would otherwise cause degraded power supply performance or even damage to the battery unit 30 due to the self-discharging property of the supercapacitor 40.

After the switching unit 130 is turned back to the OFF state, the procedure returns to the first step S1, where the MCU 110 again checks whether the operating-state detecting unit 120 detects that the automobile 10 is set to the ready-for-startup state. If YES, the above-described procedure is repeated once again.

In the foregoing operation, the apparatus of the invention 100 is characterized in the steps that the supercapacitor 40 is electrically connected to the battery unit 30 only when the user wants to drive the automobile 10, and then immediately disconnected from the battery unit 30 when the automobile 10 stops running. This feature can help to prevent the electrical connection between the battery unit 30 and the supercapacitor 40 from being exceedingly long that would otherwise cause degraded power supply performance or even damage to the battery unit 30 due to the self-discharging property, thus helping to improve the power supply performance and extends the battery life. Moreover, the supercapacitor 40 cannot be pre-charged in advance since its self-discharging property would cause the charged electricity to be quickly discharged and thus wasted. The invention solves this problem by electrically connecting the supercapacitor 40 to the battery unit 30 only at a temporal point when the user is getting ready to drive the automobile 10. In conclusion, the invention can serve as a feasible solution to the problem caused by the use of the supercapacitor 40 on the automobile 10.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on an automobile (10) of the type having a startup motor (20) which is powered by a battery unit (30) in conjunction with a supercapacitor (40) for controlling electrical connection and disconnection between the battery unit (30) and the supercapacitor (40), and which is equipped with an electrical system (50), said method comprising the steps of:

(a) at a temporal point when the automobile (10) is being set to a ready-for-startup state, connecting the battery unit (30) to the supercapacitor (40) to allow the battery unit (30) to charge the supercapacitor (40);

(b) at a temporal point when the automobile (10) is being set to a motor power-on state, electrically connecting the supercapacitor (40) to the startup motor (20) for supplying an instantaneous surge current to the startup motor (20) for initial startup;

(c) when the automobile (10) is running, maintaining the parallel configuration of the supercapacitor (40) with the battery unit (30) for supplying a steady-state voltage to the electrical system (50), and at a temporal point when the electrical system (50) is being subjected to an overload condition, using the supercapacitor (40) to supply an instantaneous surge current to the electrical system (50); and (d) at a temporal point when the automobile (10) is being set to a stop-running state, disconnecting the battery unit (30) from the supercapacitor (40).

2. The method of claim 1, wherein the ready-for-startup state is a remotely-controlled automobile-unlocking operating state.

3. The method of claim 1, wherein the ready-for-startup state is a key-triggered automobile-unlocking operating state.

4. The method of claim 1, wherein the ready-for-startup state is a motor-startup voltage-drop operating state.

5. The method of claim 1, further comprising:
whether the present-time output voltage $V_B$ of the battery unit (30) is greater the present-time charged voltage $V_C$ of the supercapacitor (40);
if YES, connecting the battery unit (30) to charge the supercapacitor (40); otherwise, if NO, enabling a voltage boosting function for the output voltage of the battery unit (30).

6. An apparatus for use on an automobile (10) of the type having a startup motor (20) which is powered by a battery unit (30) in conjunction with a supercapacitor (40) for controlling electrical connection and disconnection between the battery unit (30) and the supercapacitor (40), and which is equipped with an electrical system (50), said apparatus comprising:

(a) a microcontroller unit (110) for providing a set of control functions for controlling the operation of said apparatus;

(b) an operating-state detecting unit (120) for detecting the operating state of the automobile (10) and capable of generating a supercapacitor connection enable signal at a temporal point when the automobile (10) is set to ready-for-startup state and generating a supercapacitor connection disable signal at a temporal point when the automobile (10) is set to a stop-running state;

(c) a switching unit (130), which is interconnected between the battery unit (30) and the supercapacitor (40), and whose ON/OFF state is controlled by the microcontroller unit (110);

(d) a voltage booster (140), which is interconnected between the battery unit (30) and the supercapacitor (40) and which is capable of being activated by the microcontroller unit (110) to allow the battery unit (30) to charge the supercapacitor (40) via the voltage booster (140); and (e) a first voltage sensing module (151) and a second voltage sensing module (152), wherein the first voltage sensing module (151) is used to sense the present-time output voltage $V_B$ of the battery unit (30), while the second voltage sensing module (152) is used to sense the present-time charged voltage level $V_C$ of the supercapacitor (40); and if $V_B$ is greater than $V_C$, then the microcontroller unit (110) connects the battery unit (30) to charge the supercapacitor (40); and if $V_B$ is lower than $V_C$, then the microcontroller unit (110) enables the voltage booster (140) so as to connect the battery unit (30) to charge the supercapacitor (40) via the voltage booster (140).

7. The apparatus of claim 6, wherein the ready-for-startup state is a remotely-controlled automobile-unlocking operating state.

8. The apparatus of claim 6, wherein the ready-for-startup state is a key-triggered automobile-unlocking operating state.

9. The apparatus of claim 6, wherein the ready-for-startup state is a motor-startup voltage-drop operating state.

10. The apparatus of claim 6, wherein the switching unit (130) is an electromechanical relay, a solid-state relay (SSR), or a transistor-based electronic switch.

11. The apparatus of claim 6, wherein the microcontroller unit (110) is an embedded microprocessor.

12. The apparatus of claim 6, wherein the microcontroller unit (110) is selected from the group comprising ASIC (Application-Specific Integrated Circuit), FPGA (Field Programmable Gate Array), PLD (Programmable Logic Device), PLA (Programmable Logic Array), and PAL (Programmable Array Logic).

13. The apparatus of claim 6, further comprising an I/O control unit (200) for external linking to a keyboard, a display unit, and a wireless network.

14. The apparatus of claim 6, wherein the microcontroller unit (110) operates in such a manner that:
at a temporal point when the automobile (10) is being set to a ready-for-startup state, the microcontroller unit (110) connects the battery unit (30) to the supercapacitor (40) to allow the battery unit (30) to charge the supercapacitor (40);
at a temporal point when the automobile (10) is being set to a motor power-on state, the microcontroller unit (110) connects the supercapacitor (40) to the startup motor (20) for supplying an instantaneous surge current to the startup motor (20) for initial startup;
when the automobile (10) is running, the microcontroller unit (110) maintains the parallel configuration of the supercapacitor (40) with the battery unit (30) for supplying a steady-state voltage to the electrical system (50), and at a temporal point when the electrical system (50) is being subjected to an overload condition, using the supercapacitor (40) to supply an instantaneous surge current to the electrical system (50); and
at a temporal point when the automobile (10) is being set to a stop-running state, microcontroller unit (110) disconnects the battery unit (30) from the supercapacitor (40).

15. The apparatus of claim 6, wherein the supercapacitor (40) has a capacitance of greater than 0.1 Farad (F).

* * * * *